UNITED STATES PATENT OFFICE.

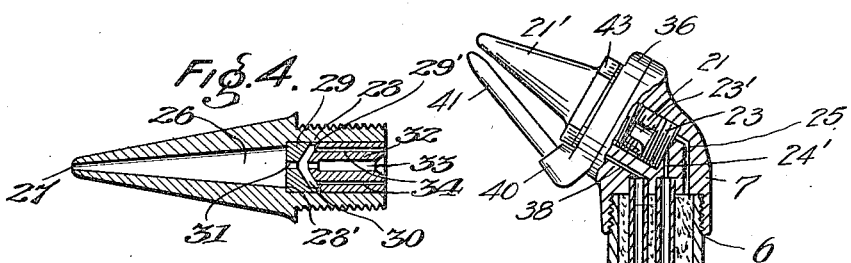

HARRY G. ALLEN, OF SEATTLE, WASHINGTON.

BLOWPIPE FOR WELDING AND CUTTING METALS.

1,060,409.

Specification of Letters Patent.     Patented Apr. 29, 1913.

Application filed June 27, 1910.   Serial No. 569,217.

*To all whom it may concern:*

Be it known that I, HARRY G. ALLEN, a citizen of the United States, residing at Seattle, in the county of King and State of Washington, have invented certain new and useful Improvements in Blowpipes for Welding and Cutting Metals, of which the following is a specification.

This invention relates to that class of gas burners or blow-pipes which are employed for producing heat for welding and analogous purposes through the consumption of an oxygenated inflammable gas, such as acetylene.

The objects of the invention are, first, the provision of improved devices whereby the combustion gases are thoroughly mixed in proximity to the discharge orifice of the apparatus to afford a flame which will possess a relatively high calorific effect; and second, to combine with the burner, adjustable means to supply a jet of oxygen against the work for associating with combustible products which are liberated through the agency of the burner-flame from the material operated upon to consume the same, as in operations known as "cutting."

The invention consists in the novel construction of the burner and its accessory parts comprising the blow-pipe, as will be hereinafter described with reference to the accompanying drawings, whereof—

Figure 1 is a view partly in side elevation and partly in longitudinal section of apparatus as constructed and organized for furnishing a compound gaseous fuel and oxygen blast. Fig. 2 is a longitudinal sectional view of the head end of the device. Figs. 3 and 4 are respectively sectional views of parts of the invention shown detached.

5 represents a tubular shell which serves as the handle by which the device is manipulated. One end of said shell is threaded into a socket 6 of a head 7 and the other end is secured within the socket 8 of a casing 9. This casing is provided with threaded openings 10 and 11 wherein are engaged cocks 12 and 13 which, in turn, are connected by flexible pipes 14 and 15 with tanks containing acetylene and oxygen. The acetylene is desirably supplied at a pressure less than that of the oxygen. The opening 10 is connected by a passage 16 and branch conduits 16' and 16² with pipes 17 and 18 extending between the head 7 and casing 9 through the interior of the shell 5.

A screw 19, having a milled head, passes through a threaded hole in the casing and, acting as a valve, coöperates with a seat 19' to regulate the flow of oxygen admitted to the pipe 17. The opening 11 is connected by a passage 20 with the interior of the shell for the admission of acetylene. Surrounding the pipes 17 and 18 the shell 5 is packed with a porous material, as asbestos, as a provision against what is known as "backfiring."

Provided in the head 7 is a cylindrical chamber 21 which, in the illustrated construction, has its axis arranged at an angle with respect to the axis of the shell, or handle, 5. This chamber is desirably threaded for engagement with the threaded cylindrical inner end 22 of a nozzle, whose outer end 21' is made conical. Seated in the bottom of the chamber 21 is a plug 23 provided with a nipple 23' extending axially outward and terminating in a conical extremity. A bore 24 extends through the nipple and plug to communicate with the pipe 18 by a duct 24'. A passage 25 extending from the interior of the shell 5 is connected by a passage 25' in the plug with the space around said nipple.

The nozzle is interiorly provided with a gas-mixing chamber 26 of gradually increasing diameter from the orifice 27 to its juncture with a cylindrical bore 28 extending from the other end of the nozzle to a shoulder 28'. Fitted within the latter and against said shoulder is a block 29 formed at its inner end with a funnel-shaped recess 30 from the apex of which is a passage 31 extending through the block. A second block 32, also fitted to the bore 28, is provided at its outer end with a conical extremity having a taper corresponding to that of the block recess 30 and is juxtaposed at its periphery with the annular ridge 29' formed about the recess of block 29. At the inner end of the block 32 is a recess into which the aforementioned conical extremity of the nipple 23' is inserted to form a non-leakable joint therebetween. Both blocks 29 and 32 are frictionally engaged within the bore 28 so as to be removable with the nozzle. A passage 33 extends axially through the block 32 to make communication between the bore 24 of the nipple and the space afforded by the recess 30. The passage 33 is also arranged in alinement with the passage 31 of the block 29.

34 denote passages extending through the block 32 to establish communication between the chamber 21 to the rear of the block with the recess 30 in proximity to the ridge 29'.

The outside of the head 7 is machined to furnish a circular post 7' and a flange face 35 whereupon is mounted a rotatable ring 36 provided with an annular cavity 37. This cavity is connected by a passage 38 in the head with the outlet end of the aforesaid pipe 17. Said cavity is likewise connected by a passage 39 with a socket formed in the ring projection 40.

41 is a pipe-nozzle secured within the lug socket and disposed to have its axis intersect a line extended through the axis of said nozzle at a short distance outside of the delivery end of the latter.

42 is a gasket to prevent leakage of gas through the intersection between the ring 36 and face 35. A nut 43 screwed upon threads provided in the periphery of the post is employed for maintaining the ring 36 against the gasket.

In my invention, the acetylene is admitted, under the control of valve 13, through passage 20 to the inside of the shell where it passes through the porous packing therein to flow by passage 25—25' into the space passages 34 into the recess 30 intermediate blocks 29 and 32. The oxygen, under a pressure exceeding that at which the acetylene is supplied, is introduced through the branch passage $16^2$ to the pipe 18 and thence by the passages 24', 24, 33 and 31 into the chamber 26 of the nozzle and in passing axially through the recess 30 induces an outflow of the acetylene therewith which is mixed within the chamber 26 to be finally jetted through the orifice 27 in a highly inflammable condition to furnish an extremely hot torch flame. It is to be remarked that the two gases which contribute to the flame are kept apart until within proximity to the point where combustion is desired. The provision of a relatively shallow and broad space afforded by the recess 30 and the converging of the same to the place of delivery causes the acetylene to be spread out in a thin film which is sucked out by the current of oxygen in condition to effect a thorough commingling of the gases within the mixing chamber.

The burning or "cutting" of metals is accomplished by utilizing the heat afforded by the flame supplied from the nozzle orifice 27 to disassociate the components of the material being attacked and then supplying in conjunction therewith a quantity of oxygen sufficient to effect the consumption of the combustible portions of such liberated elements of the material. To which ends, the screw-valve 19 is opened to allow the oxygen to be conducted through the branch passage 16' and by pipe 17 and the passage 38 to the cavity 37 within the ring 36, whence the oxygen is discharged through the pipe-nozzle 41 to perform its duty as aforesaid.

To enable the cutting operation to be lineally attained, it is advantageous and most effectually accomplished by delivering the supplemental oxygen to the rear of the flame as the blow-pipe is moved across the work, and, as will be appreciated, in the progress of cutting operations, the ring 36 is turned to accordingly present the pipe-nozzle 41 to be to the rear of the flame which emanates from the blow-pipe proper.

What I claim, is—

1. The combination of a tubular shell, a chambered head at one end of the shell, a casing at the other end of the shell provided with connections for the supply of gases, one of said connections being communicatively connected with the interior of the shell, pipes between the head and casing and extending through the shell, said casing having branch passages connecting the other of said supply connections with said pipes, valves for controlling the flow of gas through said branch passages, a nozzle connected with the head, said nozzle being provided at its inner end with a bore and at its outer end with a conical mixing chamber, two blocks fitted within the nozzle bore, said blocks being provided with passages extending axially therethrough to make communication between said mixing chamber and one of said pipes, said head having a passage, and a nozzle pipe revolubly secured by said head and connected by said passage in the head with the other one of said pipes.

2. The combination of a tubular shell, a chambered head at one end of the shell, a casing at the other end of the shell and provided with connections for the supply of gases, one of said connections being communicatively connected with the interior of the shell, pipes between the head and casing and extending through the shell, said casing having branch passages connecting the other of said supply connections with said pipes, valves for controlling the flow of gas through said branch passages, a nozzle connected with the head, said nozzle being provided at its inner end with a bore and at its outer end with a conical mixing-chamber, two blocks positioned within the nozzle bore with a space therebetween, means for establishing communication between said space and the interior of said shell, said blocks being provided with passages extending axially therethrough to make communication between said mixing chamber and one of said pipes, said head having a passage, and a nozzle pipe connected by the passage in the head with the other one of said pipes.

3. The combination of a tubular shell, a chambered head at one end of the shell, a casing at the other end of the shell and provided with connections for the supply of gases, one of said connections being communicatively connected with the interior of the shell, pipes between the head and casing and extending through the shell, said casing having branch passages connecting the other of said supply connections with said pipes, valves for controlling the flow of gas through said branch passages, a nozzle connected with the head, said nozzle being provided at its inner end with a bore and at its outer end with a conical mixing chamber, two blocks fitted within the nozzle bore with a space therebetween, means for establishing communication between said space and the interior of said shell, said blocks being provided with passages extending axially therethrough to make communication between said mixing chamber and one of said pipes, said head having a passage, and a nozzle pipe revolubly secured to said head and connected by said passage in the head with the other one of said pipes.

4. In a blow-pipe, the combination of a head having a passage therethrough, a ring provided with a nozzle revolubly mounted on said head, an annular cavity formed in said ring communicating with said nozzle, and a plurality of gas supply pipes communicating respectively with said passage and said annular cavity.

5. In a blow-pipe, the combination of a tubular shell, a head at one end of said shell with a passage therethrough, a casing at the other end of the shell provided with connections for the supply of gases, one of said connections being communicatively connected with the interior of the shell and thence with said passage, a ring provided with a nozzle revolubly mounted on said head, an annular cavity formed in said ring, communicating with said nozzle, and pipes extending through said shell which communicate with said passage and said annular cavity, respectively, at one end and with another of said gas connections at their other end.

6. In a blow pipe, the combination of a tubular shell, a chambered head at one end of the shell, a casing at the other end of the shell having a plurality of passages therein, a nozzle detachably connected with the head, said nozzle being provided with an axial bore, a block arranged in said bore having a funnel-shaped recess, and an axial passage therethrough, and a second block arranged within said bore, having a conical shaped end, and contacting said funnel shaped recess, as specified.

7. In a blow pipe, the combination of a tubular shell having a porous filling therein for disseminating the entering gases, a head removably secured thereon, a nozzle detachably connected with the head, said nozzle having an axial cylindrical bore, a block within said bore having a conical formed recess and an axial passage therethrough, and a second block having a conical formed end which is adjacent to the aforesaid recess, the space between said blocks having connection with said nozzle, as specified.

HARRY G. ALLEN.

Witnesses:
  PIERRE BARNES,
  H. BARNES.